(12) United States Patent
Jiang et al.

(10) Patent No.: US 10,333,746 B2
(45) Date of Patent: Jun. 25, 2019

(54) EFFICIENT DATA TRANSMISSION USING ORTHOGONAL PULSE SHAPES

(71) Applicant: The Board Of Regents Of The Nevada System Of Higher Education On Behalf Of The University Of Nevada, Las Vegas, Las Vegas, NV (US)

(72) Inventors: Yingtao Jiang, Las Vegas, NV (US); Elaheh Alidoosti, Las Vegas, NV (US); Taleb Moazzeni, Las Vegas, NV (US)

(73) Assignee: The Board Of Regents Of The Nevada System Of Higher Education On Behalf Of The University Of Nevada, Las Vegas, Las Vegas, NV (US)

(*) Notice: Subject to any disclaimer, the term of this patent is extended or adjusted under 35 U.S.C. 154(b) by 0 days.

(21) Appl. No.: 15/750,988

(22) PCT Filed: Aug. 8, 2016

(86) PCT No.: PCT/US2016/046028
§ 371 (c)(1),
(2) Date: Feb. 7, 2018

(87) PCT Pub. No.: WO2017/027469
PCT Pub. Date: Feb. 16, 2017

(65) Prior Publication Data
US 2018/0234272 A1 Aug. 16, 2018

Related U.S. Application Data

(60) Provisional application No. 62/202,583, filed on Aug. 7, 2015.

(51) Int. Cl.
*H04L 25/03* (2006.01)
*H04J 11/00* (2006.01)
(Continued)

(52) U.S. Cl.
CPC ........ *H04L 25/0384* (2013.01); *H04J 11/003* (2013.01); *H04J 15/00* (2013.01);
(Continued)

(58) Field of Classification Search
None
See application file for complete search history.

(56) References Cited

U.S. PATENT DOCUMENTS

2003/0128772 A1* 7/2003 Michael ............... H04B 1/7172
375/295
2008/0252422 A1* 10/2008 Dowla ................. G06K 7/0008
340/10.1
(Continued)

*Primary Examiner* — Eunsook Choi
(74) *Attorney, Agent, or Firm* — Ballard Spahr LLP

(57) ABSTRACT

Methods and systems are provided for transmitting data using an orthogonal pules shape multiplexing scheme. A transmitter can receive a vector comprising a plurality of symbols. A plurality of continuous pulses can be designed, with each of the continuous pulses corresponds to one of the plurality of symbols in the received vector. Any two pulses selected from the plurality of continuous pulses can be orthogonal. The plurality of continuous pulses can be sampled to produce a corresponding plurality of discrete pulses. The received vector can be transformed based on a transform matrix constructed using on the plurality of discrete pulses. The transformed vector can be transmitted to a receiver.

20 Claims, 3 Drawing Sheets

(51) Int. Cl.
*H04J 99/00* (2009.01)
*H04L 27/26* (2006.01)

(52) U.S. Cl.
CPC .... *H04L 25/0391* (2013.01); *H04L 25/03343* (2013.01); *H04L 25/03834* (2013.01); *H04L 27/26* (2013.01); *H04L 27/2627* (2013.01); *H04L 27/2634* (2013.01); *H04L 27/2639* (2013.01)

(56) References Cited

U.S. PATENT DOCUMENTS

| | | | | |
|---|---|---|---|---|
| 2009/0003472 | A1* | 1/2009 | Dent | H04L 25/03834 375/260 |
| 2009/0074119 | A1* | 3/2009 | Nekoogar | H04B 1/71632 375/346 |
| 2009/0225899 | A1* | 9/2009 | Dent | H04L 25/03343 375/296 |
| 2012/0120787 | A1* | 5/2012 | Ashrafi | H04B 1/7172 370/208 |
| 2015/0280863 | A1* | 10/2015 | Muqaibel | H04L 1/0048 375/350 |
| 2017/0099122 | A1* | 4/2017 | Hadani | H04L 27/2639 |

* cited by examiner

EFFICIENT DATA TRANSMISSION USING ORTHOGONAL PULSE SHAPES

CROSS-REFERENCE TO RELATED PATENT APPLICATIONS

This application is a U.S. National Phase of International Application No. PCT/US2016/046028, which was filed Aug. 8, 2016, and which claims the benefit of priority to U.S. Patent Application No. 62/202,583, filed on Aug. 7, 2015. The content of this earlier filed application is hereby incorporated herein by reference in its entirety.

BACKGROUND

Due to escalating demands for spectrum resources, efficient use of bandwidth resources is a key parameter in design and realization of communication systems. Commonly used technologies for improving spectral efficiency include digital modulation techniques such as frequency-shift keying (FSK), phase-shift keying (PSK), and quadrature amplitude modulation (QAM). Signal multiplexing techniques such as frequency division multiplexing (FDM), time division multiplexing (TDM) and code division multiplexing (CDM) can also be used to improve data rates in a communication system. Of the multiplexing techniques used in modern wired and wireless communications systems, orthogonal FDM achieves the highest bandwidth efficiency (e.g., is closest to the Nyquist rate).

Faster than Nyquist signaling can be possible, but such systems sacrifice orthogonality and inter-symbol interference-free transmission over an additive white Gaussian noise (AWGN) channel are lost. Accordingly, such signaling systems suffer from a compromised signal to noise ratio, and introduce added complexity in the transmitter and receiver. These and other shortcomings are addressed in the present disclosure.

SUMMARY

It is to be understood that both the following general description and the following detailed description are exemplary and explanatory only and are not restrictive. Provided are methods and systems for transmitting information efficiently using wireless communications through orthogonal pulse shape multiplexing (OPSM). In an aspect, the OPSM methods and systems shape a pulse based on orthogonal pulses generated using mathematical functions, such as the Hermite functions. The shaped pulses can allow for more efficient data transmission in both the time and frequency domains.

In an aspect, a vector comprising a plurality of symbols can be received at a transmitter. A plurality of continuous pulses are designed, with each of the continuous pulses corresponds to one of the plurality of symbols in the received vector. Any two pulses selected from the plurality of continuous pulses can be orthogonal. The plurality of continuous pulses can be sampled to produce a corresponding plurality of discrete pulses. The received vector can be transformed based on a transform matrix constructed using on the plurality of discrete pulses. The transformed vector can be transmitted to a receiver.

In another aspect, a system can comprise a memory having computer-executable instructions encoded thereon and a processor functionally coupled to the memory. The processor can be configured, by the computer-executable instructions, for receiving a vector comprising a plurality of symbols. A plurality of continuous pulses can be designed, with each of the continuous pulses corresponds to one of the plurality of symbols in the received vector. Any two pulses selected from the plurality of continuous pulses can be orthogonal. The plurality of continuous pulses can be sampled to produce a corresponding plurality of discrete pulses. The received vector can be transformed based on a transform matrix constructed using on the plurality of discrete pulses. The transformed vector can be transmitted to a receiver.

In yet another aspect, a non-transitory computer-readable medium can have computer-executable instructions encoded thereon. When executed, the computer-executable instructions can cause the computer to perform steps comprising receiving a vector comprising a plurality of symbols. A plurality of continuous pulses can be designed, with each of the continuous pulses corresponds to one of the plurality of symbols in the received vector. Any two pulses selected from the plurality of continuous pulses can be orthogonal. The plurality of continuous pulses can be sampled to produce a corresponding plurality of discrete pulses. The received vector can be transformed based on a transform matrix constructed using on the plurality of discrete pulses. The transformed vector can be transmitted to a receiver.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
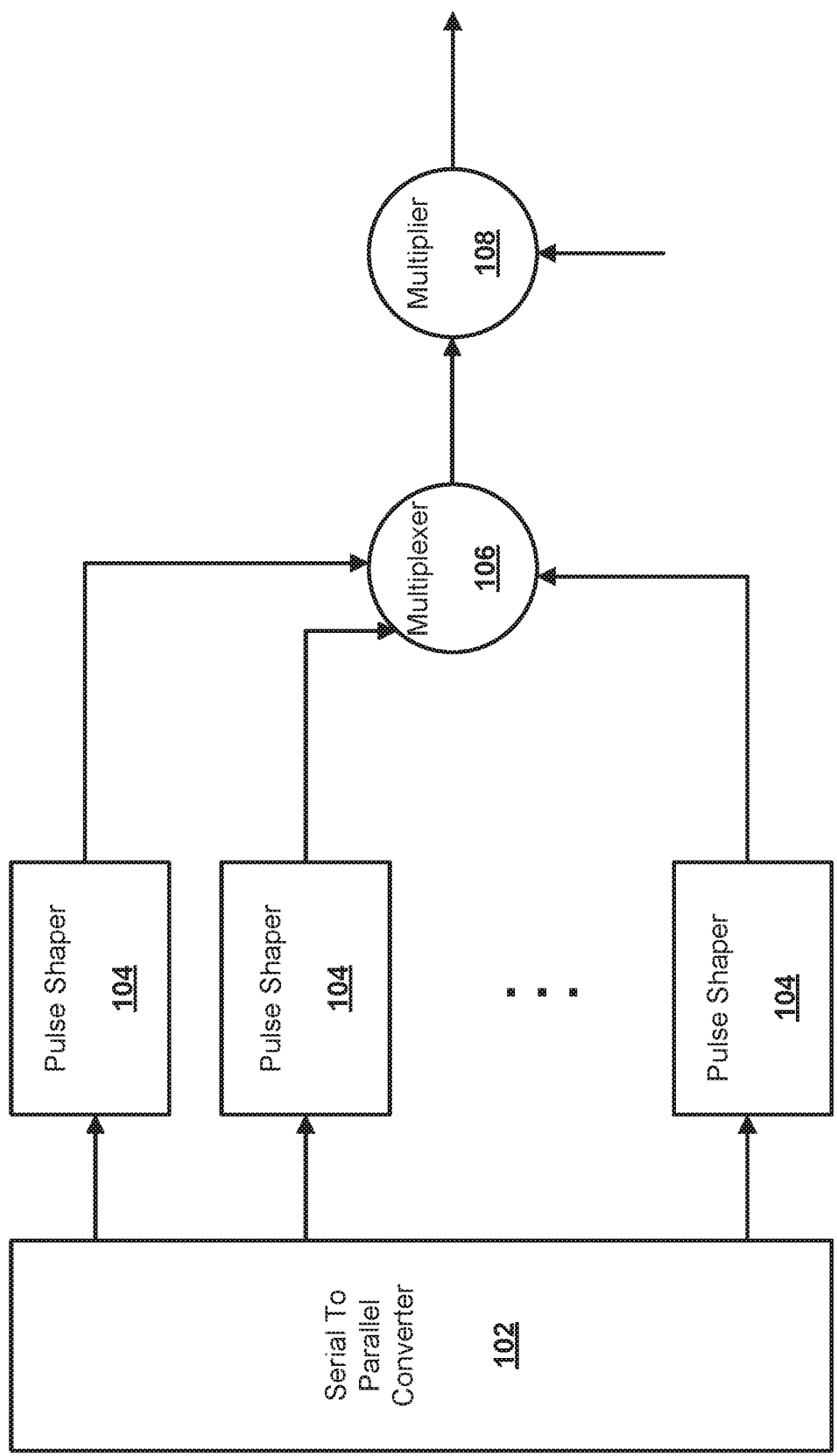
FIG. 1 illustrates various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Continuous orthogonal pulses based on a relatively compact function having very small side lobe amplitude, such as orthogonal Hermite functions, facilitate increased concentration of information in both time and frequency domains. Due to their efficient time-bandwidth localization, the Hermite functions can be used for signaling schemes in communications systems including orthogonal modulation and orthogonal multiplexing. A new digital multiplexing scheme based on orthogonal pulse shape can be used to improve data transmissions between c computers by increasing bandwidth usage with similar performance as an orthogonal FDM system.

Orthogonality of signals allows for multiple signals to be multiplexed to a single signal and demultiplexed in a usable state by orthogonal functions. Many types of orthogonal functions (e.g., sines and cosines, Legendre polynomials, Chebyshev polynomials, and Hermite functions) can be used as orthogonal signals. In an aspect, Hermite functions, exhibit compact time-frequency characteristics which can allow for increased spectrum efficiency. For N-dimensional functions, minimum time-frequency product can be given by the equation $$\Delta T \Delta F = \frac{N}{4\pi}$$

In an aspect, Hermite functions can be used as the orthogonal functions. For example, one or more sub-channels can comprise a Hermite function. The Hermite functions can have desirable characteristics such as a relatively short duration pulse (e.g., an orthogonal continuous pulse) and a relatively compact spread in the frequency domain. The Hermite functions can be given by the equation:

$$\Psi_n(t, \alpha) = \sqrt{\alpha} \frac{H_n(\alpha t) e^{-(\alpha t)^2/2}}{\sqrt{2^n n! \sqrt{\pi}}}$$

Where $\alpha$ is a scaling factor associated with a pulse width and $H_n(t)$ are the Hermite polynomials obtained recursively by $$H_0(t) = 1$$

$$H_1(t) = 2t$$

$$H_{n+1}(t) = 2t H_n(t) - 2n H_{n-1}(t)$$

In an aspect, at least one (e.g., each) of the one or more sub-channels can be assigned a pulse function such as:

$$\tilde{\psi}_n(t, \alpha) = \frac{\alpha}{\sqrt{2^n n! \pi}} H_n(\alpha t) e^{-(\alpha t)^2}$$

This function can be easily generated from higher order derivatives of a Gaussian function:

$$\tilde{\psi}_n(t, \alpha) = (-1)^n \frac{1}{\sqrt{2^n n! \pi}} \frac{d^n}{d(\alpha t)^n} \left( \alpha e^{-(\alpha t)^2} \right)$$

According to the Hermite function equations given above, any pulse function $\tilde{\psi}_n(t,\alpha)$ can be recovered at the receiver by multiplying the received signal with $h_n(\alpha t)$. The pulse function $\tilde{\psi}_n(t,\alpha)$ can have a shorter time duration as the scaling factor $\alpha$ in the Gaussian function is increased.

A scaling factor $\alpha$ can represent a time duration of the orthogonal continuous pulses. For a parallel multiplexing system with pulses having a duration of $T_s$, an N-th order pulse can be confined to the interval of $NT_s$. The scaling factor $\alpha$ can be represented by $$\alpha = \frac{b_N}{NT_s}$$

where $b_N$ is an adjusting parameter selected based on a number of orthogonal continuous pulses. In an aspect, the adjusting factor $b_N$ can be made substantially identical for each pulse, so that each of the orthogonal continuous pulses has the same scaling factor $\alpha$.

To determine values of $b_N$, for simplicity the original stream of pulses can be assumed to have a duration of $T_b=1$ second. Then, the design parameter, $b_N$ can be obtained from the Table below.

|  | N | | | | | | |
| --- | --- | --- | --- | --- | --- | --- | --- |
|  | 2 | 4 | 8 | 16 | 32 | 64 | 128 |
| $b_N$ | 4.10 | 4.90 | 4.05 | 4 | 3.52 | 3 | 3.36 |
| Attenuation Value | 0.24 | 0.17 | 0.02 | 0.03 | 0.04 | 0.04 | 0.017 |

An exemplary system 100 is shown in FIG. 1. As shown in FIG. 1, data can be input to a serial to parallel converter 102. Data to be transmitted can be represented based on signal shape. Pulses in the transmission scheme can be shaped by pulse shapers 104 such that the pulses in any one sub-channel are orthogonal to the pulses in all other sub-channels. In an aspect, using different orders of orthogonal functions can degrade spectrum efficiency. However, by parallelizing the pulse shaping and using compact time-bandwidth signaling such as Hermite functions, relatively high spectrum efficiency can be achieved.

Using orthogonal Hermite signals with N pulses, the time-bandwidth product is $N/4\pi$. In comparison, the time-bandwidth product for traditional orthogonal FDM signals is N. Accordingly, the time-bandwidth product of the Hermite signals is $4\pi$ times smaller than that of orthogonal FDM signals, based on a root-mean-square (RMS) bandwidth definition. Moreover, the time-bandwidth product of the Hermite signals is also more efficient than that of orthogonal FDM signals using other bandwidth measurements, such as a 90% pulse energy measurement. In particular, time-bandwidth product for Hermite signals can be determined numerically.

In one or more aspects (e.g., aspects related to communications), Hermite functions can be scaled to fit into a symbol period such that a sufficient amount of pulse energy is contained in the symbol period. Because Hermite functions are time-infinite waveforms with unity energy, a predetermined percentage of the pulse energy can be determined to be within the symbol period. For example, a 90% energy criterion can be used to limit the time span of the waveforms. In another aspect, an M-th order pulse (e.g., a widest pulse) can be confined to an interval of $MT_b$ such that the value of the M-th order pulse can receive a minimum possible attenuation at the energy criterion (e.g., 90%) for pulse truncation. In an aspect, a time-bandwidth product, $\Delta T_M \Delta F_M$ of the Hermite pulses can be selected based on the following Table.

|  | M | | | | | | |
| --- | --- | --- | --- | --- | --- | --- | --- |
|  | 2 | 4 | 8 | 16 | 32 | 64 | 128 |
| $\Delta T_M \Delta F_M$ | 2.00 | 2.13 | 3.67 | 4.95 | 6.00 | 7.93 | 11.82 |

Accordingly, the numerical analysis can be shown to bear a time-bandwidth product that is about 2 to about 8 times less than that of an orthogonal FDM system for a moderate to large number of sub-channels (e.g., about 8 to about 64 sub-channels). In an aspect, a larger number of sub-channels can result in higher-order multiplexing, increasing computational complexity and bandwidth efficiency.

The pulse shapers 104 can be used to create shaped pulses in the discrete domain using relatively compact functions having very small side lobe amplitude (e.g., Hermite functions). Orthogonal continuous pulses can be designed based on Hermite functions.

The continuous pulses can be converted to discrete orthogonal pulses by sampling the continuous pulses. That is, the continuous orthogonal pulses can be periodically sampled to create discrete orthogonal pulses. To span all, or substantially all, of the frequency information of the continuous orthogonal pulses, the discrete orthogonal pulses can have a minimum sampling rate of 2N, where N is the number of pulses. In an aspect, higher sampling rates (e.g., 3N, 4N, etc.) can also be used. In an aspect, any sampling rate greater than the minimum sampling rate can be used.

The discrete orthogonal pulses can be combined at a multiplexer 106 to form a transform matrix H. In an aspect, the N symbols to be transmitted can be formed as a vector X. To transmit the vector X, it can be multiplied by the transform matrix H at a multiplier 108 to create a transmission vector Y, such that $$Y = XH = [x_1, x_2, \ldots, x_n] \begin{bmatrix} h_{1,1} & h_{1,2} & \ldots & h_{1,2N} \\ h_{2,1} & h_{2,2} & \ldots & h_{2,2N} \\ \vdots & \vdots & \vdots & \vdots \\ h_{N,1} & h_{N,2} & \ldots & h_{N,2N} \end{bmatrix}$$

Because the number of samples of each discrete function is at least twice the number of functions, the transform matrix H is not square, and thus is not orthogonal. However, since all of the rows are mutually orthonormal, the transpose, $H^T$, can be used to recover the original vector X from the transmission vector Y. In an aspect, the error probability for a signal transmitted in this manner can be approximately equal to error probabilities of a signal constellation used for modulation, such as binary phase shifted key (BPSK).

Figure 2:
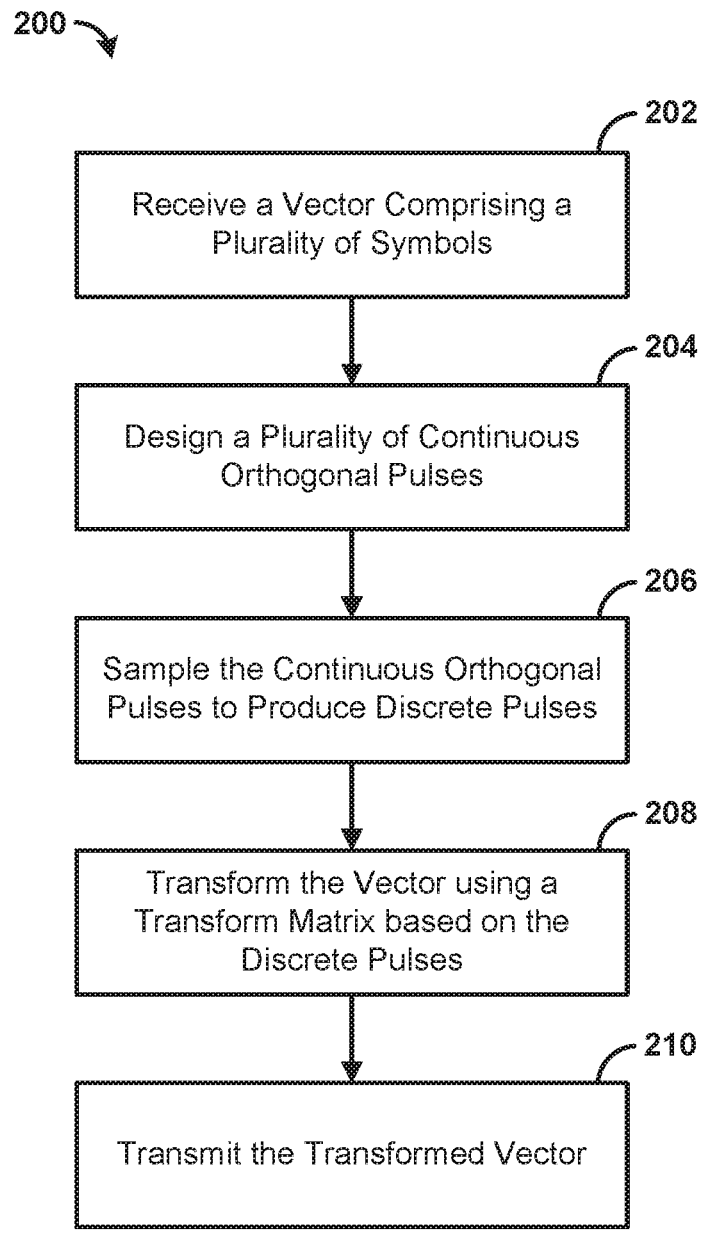
FIG. 2 is a flowchart illustrating an example method.

FIG. 2 shows an exemplary method 200. At step 202, a transmitter can receive a vector comprising a plurality of symbols. In an aspect, the vector can comprise symbols for transmission. For example, the symbols can be separate communications for simultaneous or near-simultaneous transmission. In an aspect, the vector can comprise at least 8 symbols. In an aspect, the transmitter can comprise any device with a processor and an antenna for transmitting signals.

At step 204, a plurality of continuous pulses can be designed. In an aspect, each of the continuous pulses corresponds to one of the plurality of symbols in the received vector. In another aspect, any two pulses selected from the plurality of continuous pulses are orthogonal. In one aspect, the continuous pulses can be predefined pulses stored at the transmitter. For example, a transmitter capable of transmitting N signals simultaneously can store N predefined continuous pulses. In an aspect, the continuous orthogonal pulses can be based on a relatively compact function having very small side lobe amplitude. For example, the continuous orthogonal pulses can be selected based on Hermite functions.

At step 206, the transmitter can sample the plurality of continuous pulses to produce a corresponding plurality of discrete pulses. In an aspect, the sampling rate used to sample the pulses can be based on the number of pulses. For example, the sampling rate can be twice the number of pulses.

At step 208, the vector is transformed using a transform matrix. In an aspect, the transform matrix can be constructed based on the plurality of discrete pulses. In an aspect, the transform matrix can comprise a plurality of separate rows, where each row corresponds to one of the plurality of discrete orthogonal pulses. In another aspect the number of columns in the transport matrix corresponds to the number of samples used to form the discrete orthogonal pulses. For example, the transform matrix can be N rows, by 2N column. Accordingly, because the transform matrix can be non-square, it can be non-orthogonal. However, each pair of rows of the transform matrix can be mutually orthonormal. Accordingly, a transpose of the transform matrix can be used to recover the original signals after transform. In an aspect, transforming the vector can comprise multiplying the received vector by the transform matrix In step 210, the transformed vector can be transmitted to a receiver. In an aspect, the vector can be transmitted wirelessly. For example, the vector can be transmitted as a radio frequency (RF) signal.

Figure 3:
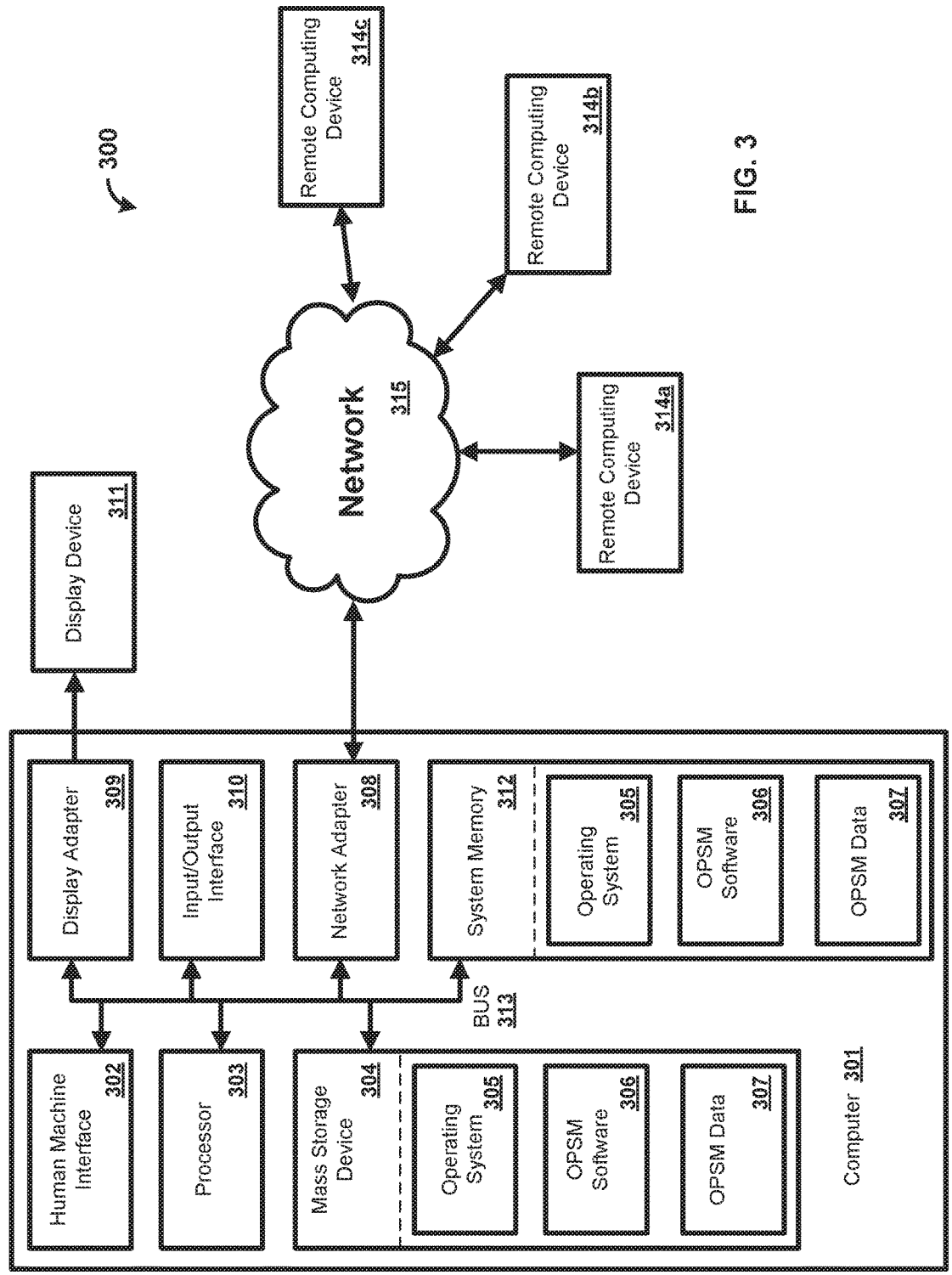
FIG. 3 is a block diagram illustrating an example computing device.

In an exemplary aspect, the methods and systems can be implemented on a computer 301 as illustrated in FIG. 3 and described below. By way of example, the system 100 of FIG. 1 can be a computer as illustrated in FIG. 3. Similarly, the methods and systems disclosed can utilize one or more computers to perform one or more functions in one or more locations. FIG. 3 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that performs particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 301. The components of the computer 301 can comprise, but are not limited to, one or more processors 303, a system memory 312, and a system bus 313 that couples various system components including the one or more processors 303 to the system memory 312. The system can utilize parallel computing.

The system bus 313 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 313, and all buses specified in this description can also be implemented over a wired or wireless network connection and each of the subsystems, including the one or more processors 303, a mass storage device 304, an operating system 305, orthogonal pulse shape multiplexing software 306, orthogonal pulse shape multiplexing data 307, a network adapter 308, the system memory 312, an Input/Output Interface 310, a display adapter 309, a display device 311, and a human machine interface 302, can be contained within one or more remote computing devices 314a,b,c at physically separate locations, connected through buses of this form, in effect implementing a fully distributed system.

The computer 301 typically comprises a variety of computer readable media. Exemplary readable media can be any available media that is accessible by the computer 301 and comprises, for example and not meant to be limiting, both volatile and non-volatile media, removable and non-removable media. The system memory 312 comprises computer readable media in the form of volatile memory, such as random access memory (RAM), and/or non-volatile memory, such as read only memory (ROM). The system memory 312 typically contains data such as the orthogonal pulse shape multiplexing data 307 and/or program modules such as the operating system 305 and the orthogonal pulse shape multiplexing software 306 that are immediately accessible to and/or are presently operated on by the one or more processors 303.

In another aspect, the computer 301 can also comprise other removable/non-removable, volatile/non-volatile computer storage media. By way of example, FIG. 3 illustrates the mass storage device 304 which can provide non-volatile storage of computer code, computer readable instructions, data structures, program modules, and other data for the computer 301. For example and not meant to be limiting, the mass storage device 304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 304, including by way of example, the operating system 305 and the orthogonal pulse shape multiplexing software 306. Each of the operating system 305 and the orthogonal pulse shape multiplexing software 306 (or some combination thereof) can comprise elements of the programming and the orthogonal pulse shape multiplexing software 306. The orthogonal pulse shape multiplexing data 307 can also be stored on the mass storage device 304. The orthogonal pulse shape multiplexing data 307 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 301 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 303 via the human machine interface 302 that is coupled to the system bus 313, but can be connected by other interface and bus structures, such as a parallel port, game port, an IEEE 1394 Port (also known as a Firewire port), a serial port, or a universal serial bus (USB).

In yet another aspect, the display device 311 can also be connected to the system bus 313 via an interface, such as the display adapter 309. It is contemplated that the computer 301 can have more than one display adapter 309 and the computer 301 can have more than one display device 311. For example, a display device can be a monitor, an LCD (Liquid Crystal Display), or a projector. In addition to the display device 311, other output peripheral devices can comprise components such as speakers (not shown) and a printer (not shown) which can be connected to the computer 301 via the Input/Output Interface 310. Any step and/or result of the methods can be output in any form to an output device. Such output can be any form of visual representation, including, but not limited to, textual, graphical, animation, audio, tactile, and the like. The display 311 and computer 301 can be part of one device, or separate devices.

The computer 301 can operate in a networked environment using logical connections to one or more remote computing devices 314a,b,c. By way of example, a remote computing device can be a personal computer, portable computer, smartphone, a server, a router, a network computer, a peer device or other common network node, and so on. Logical connections between the computer 301 and a remote computing device 314a,b,c can be made via a network 315, such as a local area network (LAN) and/or a general wide area network (WAN). Such network connections can be through the network adapter 308. The network adapter 308 can be implemented in both wired and wireless environments. Such networking environments are conventional and commonplace in dwellings, offices, enterprise-wide computer networks, intranets, and the Internet.

For purposes of illustration, application programs and other executable program components such as the operating system 305 are illustrated herein as discrete blocks, although it is recognized that such programs and components reside at various times in different storage components of the computing device 301, and are executed by the one or more processors 303 of the computer. An implementation of the orthogonal pulse shape multiplexing software 306 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow;

plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
  receiving, at a transmitter, a vector comprising a plurality of symbols;
  designing a plurality of continuous pulses, wherein each of the continuous pulses corresponds to one of the plurality of symbols in the received vector, and wherein any two pulses selected from the plurality of continuous pulses are orthogonal;
  sampling the plurality of continuous pulses to produce a corresponding plurality of discrete pulses;
  transforming the received vector based on a transform matrix constructed based on the plurality of discrete pulses; and
  transmitting the transformed vector to a receiver.

2. The method of claim 1, wherein the continuous orthogonal pulses are designed based on Hermite functions.

3. The method of claim 1, wherein a minimum sampling rate for sampling the plurality of continuous orthogonal pulses is selected based on a number of symbols in the received vector.

4. The method of claim 1, wherein all rows of the transform matrix are mutually orthonormal.

5. The method of claim 1, wherein a time duration of each of the plurality of continuous pulses has a pulse width selected based on a number of symbols in the received vector.

6. The method of claim 1, wherein the plurality of symbols comprises at least 8 symbols.

7. The method of claim 1, wherein transforming the received vector comprises multiplying the received vector by the constructed transform matrix.

8. A system comprising:
  a memory having computer-executable instructions encoded thereon; and
  a processor functionally coupled to the memory and configured, by the computer-executable instructions, for,
    receiving, at a transmitter, a vector comprising a plurality of symbols;
    designing a plurality of continuous pulses, wherein each of the continuous pulses corresponds to one of the plurality of symbols in the received vector, and wherein any two pulses selected from the plurality of continuous pulses are orthogonal;
    sampling the plurality of continuous pulses to produce a corresponding plurality of discrete pulses;
    transforming the received vector based on a transform matrix constructed based on the plurality of discrete pulses; and
    transmitting the transformed vector to a receiver.

9. The system of claim 8, wherein the continuous orthogonal pulses are designed based on Hermite functions.

10. The system of claim 8, wherein a minimum sampling rate for sampling the plurality of continuous orthogonal pulses is selected based on a number of symbols in the received vector.

11. The system of claim 8, wherein all rows of the transform matrix are mutually orthonormal.

12. The system of claim 8, wherein a time duration of each of the plurality of continuous pulses has a pulse width selected based on a number of symbols in the received vector.

13. The system of claim 8, wherein the plurality of symbols comprises at least 8 symbols.

14. The system of claim 8, wherein transforming the received vector comprises multiplying the received vector by the constructed transform matrix.

15. A non-transitory computer-readable medium having computer-executable instructions encoded thereon that, when executed, cause the computer to perform steps comprising:
  receiving, at a transmitter, a vector comprising a plurality of symbols;
  designing a plurality of continuous pulses, wherein each of the continuous pulses corresponds to one of the plurality of symbols in the received vector, and wherein any two pulses selected from the plurality of continuous pulses are orthogonal;
  sampling the plurality of continuous pulses to produce a corresponding plurality of discrete pulses;
  transforming the received vector based on a transform matrix constructed based on the plurality of discrete pulses; and
  transmitting the transformed vector to a receiver.

16. The non-transitory computer-readable medium of claim 15, wherein the continuous orthogonal pulses are designed based on Hermite functions.

17. The non-transitory computer-readable medium of claim 15, wherein a minimum sampling rate for sampling the plurality of continuous orthogonal pulses is selected based on a number of symbols in the received vector.

18. The non-transitory computer-readable medium of claim 15, wherein all rows of the transform matrix are mutually orthonormal.

19. The non-transitory computer-readable medium of claim 15, wherein a time duration of each of the plurality of continuous pulses has a pulse width selected based on a number of symbols in the received vector.

20. The non-transitory computer-readable medium of claim 15, wherein the plurality of symbols comprises at least 8 symbols.

* * * * *